United States Patent
Tian et al.

(10) Patent No.: US 9,641,296 B2
(45) Date of Patent: May 2, 2017

(54) DATA TRANSMISSION METHOD AND SYSTEM, BASE STATION AND USER EQUIPMENT

(71) Applicant: Huawei Technologies Co., Ltd., Shenzhen, Guangdong (CN)

(72) Inventors: Chunchang Tian, Beijing (CN); Yongxing Zhou, Beijing (CN); Qiang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 222 days.

(21) Appl. No.: 14/471,950

(22) Filed: Aug. 28, 2014

(65) Prior Publication Data

US 2015/0023289 A1 Jan. 22, 2015

Related U.S. Application Data

(63) Continuation of application No. PCT/CN2013/072340, filed on Mar. 8, 2013.

(30) Foreign Application Priority Data

Mar. 8, 2012 (CN) .......................... 2012 1 0059397

(51) Int. Cl.
*H04W 4/00* (2009.01)
*H04L 5/00* (2006.01)
(Continued)

(52) U.S. Cl.
CPC .............. *H04L 5/0037* (2013.01); *H04L 1/00* (2013.01); *H04L 1/08* (2013.01); *H04L 5/0044* (2013.01);
(Continued)

(58) Field of Classification Search
CPC . H04L 5/0037; H04L 1/00; H04L 1/08; H04L 5/0044; H04L 5/0064; H04L 5/0094
See application file for complete search history.

(56) References Cited

U.S. PATENT DOCUMENTS

2009/0175373 A1 7/2009 Kwon et al.
2009/0207797 A1 8/2009 Shen et al.
(Continued)

FOREIGN PATENT DOCUMENTS

CN 101931442 A 12/2010
CN 101932098 A 12/2010
(Continued)

OTHER PUBLICATIONS

"L1/L2 Control Channel Size and Cat0 in E-UTRA Downlink", Texas Instruments, 3GPP TSG RAN WG1#47bis, Jan. 15-19, 2007, 9 pages.
(Continued)

*Primary Examiner* — Kiet Tang

(57) ABSTRACT

Embodiments of the present invention provide a data transmission method and system, a base station, and a user equipment (UE). The method includes: obtaining, by a base station, a second number of physical resource blocks (PRBs) according to a first number of PRBs, where the second number of PRBs is smaller than the first number of PRBs, and the first number of PRBs is exactly divisible by the second number of PRBs; sending, by the base station, indication information to a UE, where the indication information is used to indicate the second number of PRBs or an encoded bit repetition multiple, and the encoded bit repetition multiple is equal to the first number of PRBs divided by the second number of PRBs; and obtaining, by the UE, the encoded bit repetition multiple according to the indication
(Continued)

information, and performing data transmission according to the encoded bit repetition multiple.

20 Claims, 2 Drawing Sheets

(51) Int. Cl.
*H04L 1/00* (2006.01)
*H04L 1/08* (2006.01)
*H04W 28/18* (2009.01)

(52) U.S. Cl.
CPC .......... *H04L 5/0064* (2013.01); *H04L 5/0094* (2013.01); *H04W 28/18* (2013.01)

(56) References Cited

U.S. PATENT DOCUMENTS

| | | |
|---|---|---|
| 2011/0243103 A1 | 10/2011 | Kowalski et al. |
| 2011/0274076 A1 | 11/2011 | Classon et al. |
| 2012/0008584 A1* | 1/2012 | Higuchi ................ H04L 5/0053 370/329 |
| 2013/0128852 A1 | 5/2013 | Xue et al. |
| 2013/0188566 A1* | 7/2013 | Zhu ..................... H04W 72/042 370/329 |

FOREIGN PATENT DOCUMENTS

| | | |
|---|---|---|
| CN | 102006623 A | 4/2011 |
| CN | 102340875 A | 2/2012 |
| EP | 2 225 863 A1 | 9/2010 |

OTHER PUBLICATIONS

"Primary BCH performance; coverage and detection", Nokia Siemens Networks, Nokia, 3GPP TSG RAN WG1 #49bis Meeting, Jun. 25-29, 2007, 6 pages.

"Resource indexing for PUCCH format 3", Samsung, 3GPP TSG RAN WG1 #63, Nov. 15-19, 2010, 6 pages.

"3rd Generation Partnership Project; Technical Specification Group Radio Access Network; Evolved Universal Terrestrial Radio Access (E-UTRA); Physical layer procedures (Release 10)", 3GPP TS 36.213 v10.4.0, Dec. 2011, 125 pages.

* cited by examiner

DATA TRANSMISSION METHOD AND SYSTEM, BASE STATION AND USER EQUIPMENT

CROSS-REFERENCE TO RELATED APPLICATIONS

This application is a continuation of International Application No. PCT/CN2013/072340, filed on Mar. 8, 2013, which claims priority to Chinese Patent Application No. 201210059397.2, filed on Mar. 8, 2012, both of which are hereby incorporated by reference in their entireties.

TECHNICAL FIELD

Embodiments of the present invention relate to the field of communications technologies, and in particular, to a data transmission method and system, a base station, and a user equipment.

BACKGROUND

In a radio communications system, a maximum coverage capability is a very important performance index. In the prior art, in order to effectively enhance the maximum coverage capability, a signal to interference plus noise ratio at a receive end is generally reduced. That is, redundancy is added to a transmitted signal, so that the receive end increases a signal-to-noise ratio by combining repeated information, thereby effectively enhancing the maximum coverage capability.

For example, in an existing Long Term Evolution (Long Term Evolution, LTE) system, a code rate may be reduced to decrease the signal to interference plus noise ratio of the receive end and enhance the maximum coverage capability of the radio communications system. In the LTE system, an encoded bit is stored in a cyclic buffer. Based on the cyclic buffer, a transmit end may map the encoded bit to a physical resource block (physical resource block, PRB) of a frequency domain resource in a repeated manner. According to a predefined table, in which a transport block size and a modulation and coding scheme are mapped to carried data bits in Section 7.1.7 of a standard 36.213 currently prepared by a 3GPP organization, a minimum code rate that can be achieved is approximately 0.1.

However, in some special scenarios, for example, if power of a base station is very low, a scope to be covered is very wide, or an environment in which a user equipment (User Equipment, UE) has severe interference, a data transmission manner that supports a lower code rate is required. However, the solution in the prior art is unable to implement data transmission at a code rate lower than 0.1.

SUMMARY

Embodiments of the present invention provide a data transmission method and system, a base station and a user equipment to correct a defect in the prior art that data transmission at a code rate lower than 0.1 cannot be implemented.

An embodiment of the present invention provides a data processing method, including:

obtaining a second number of physical resource blocks according to a first number of physical resource blocks, where the second number of physical resource blocks is smaller than the first number of physical resource blocks, and the first number of physical resource blocks is exactly divisible by the second number of physical resource blocks; and sending indication information to a user equipment, where the indication information is used to indicate the second number of physical resource blocks or an encoded bit repetition multiple, and the encoded bit repetition multiple is equal to the first number of physical resource blocks divided by the second number of physical resource blocks.

An embodiment of the present invention further provides a data transmission method, including:

receiving indication information that is sent by a base station and used to indicate an encoded bit repetition multiple or a second number of physical resource blocks, where the second number of physical resource blocks is obtained by the base station according to a first number of physical resource blocks, the second number of physical resource blocks is smaller than the first number of physical resource blocks, the first number of physical resource blocks is exactly divisible by the second number of physical resource blocks, and the encoded bit repetition multiple is equal to the first number of physical resource blocks divided by the second number of physical resource blocks;

obtaining the encoded bit repetition multiple according to the indication information; and performing data transmission according to the encoded bit repetition multiple.

An embodiment of the present invention further provides a base station, including:

an obtaining module, configured to obtain a second number of physical resource blocks according to a first number of physical resource blocks, where the second number of physical resource blocks is smaller than the first number of physical resource blocks, and the first number of physical resource blocks is exactly divisible by the second number of physical resource blocks; and a sending module, configured to send indication information to a user equipment, where the indication information is used to indicate the second number of physical resource blocks or an encoded bit repetition multiple, and the encoded bit repetition multiple is equal to the first number of physical resource blocks divided by the second number of physical resource blocks.

An embodiment of the present invention further provides a user equipment, including:

a receiving module, configured to receive indication information that is sent by a base station and used to indicate an encoded bit repetition multiple or a second number of physical resource blocks, where the second number of physical resource blocks is obtained by the base station according to a first number of physical resource blocks, the second number of physical resource blocks is smaller than the first number of physical resource blocks, the first number of physical resource blocks is exactly divisible by the second number of physical resource blocks, and the encoded bit repetition multiple is equal to the first number of physical resource blocks divided by the second number of physical resource blocks;

an obtaining module, configured to obtain the encoded bit repetition multiple according to the indication information; and a processing module, configured to perform data transmission according to the encoded bit repetition multiple.

An embodiment of the present invention further provides a data transmission system, including a base station described above and a user equipment described above.

According to a data transmission method and system, a base station and a user equipment in the embodiments of the present invention, by using the foregoing technical solutions, the base station obtains a second number of physical resource blocks according to a first number of physical resource blocks, and sends indication information that is used to indicate an encoded bit repetition multiple or the second number of physical resource blocks, to the user equipment, where the encoded bit repetition multiple is equal to the first number of physical resource blocks divided by the second number of physical resource blocks; and the user equipment obtains the encoded bit repetition multiple according to the indication information, and performs data transmission according to the encoded bit repetition multiple. Compared with the prior art that can achieve a minimum code rate of 0.1, the technical solutions in the embodiments of the present invention enables data transmission to be performed according to the encoded bit repetition multiple, thereby further reducing the code rate, implementing data transmission at a code rate lower than 0.1, and further enhancing a maximum coverage capability of a radio communications system.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

Figure 1:
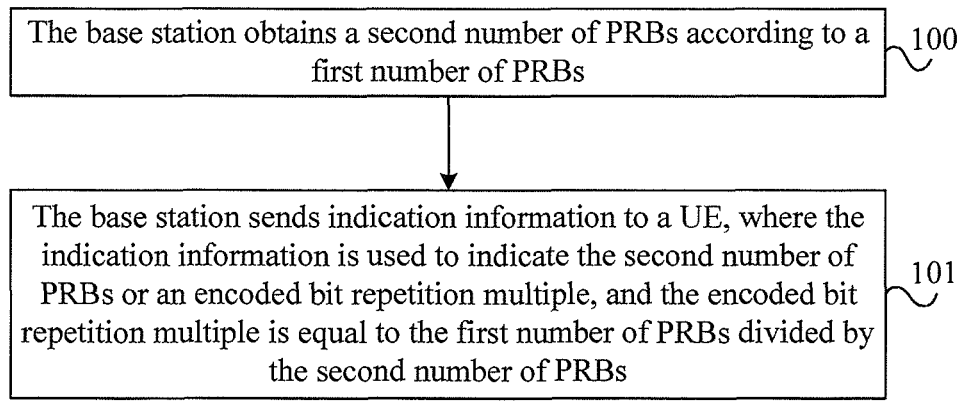
FIG. 1 is a flowchart of a data processing method according to an embodiment of the present invention.

To make the objectives, technical solutions, and advantages of the embodiments of the present invention clearer, the following clearly and describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, technical solutions of the present invention may be applied to various communications systems, for example, a Global System for Mobile Communications (GSM, Global System of Mobile communication) system, a Code Division Multiple Access (CDMA, Code Division Multiple Access) system, a Wideband Code Division Multiple Access (WCDMA, Wideband Code Division Multiple Access) system, a General Packet Radio Service (GPRS, General Packet Radio Service), a Long Term Evolution (LTE, Long Term Evolution) system, a Long Term Evolution Advanced (LTE-A, Long Term Evolution Advanced) system, and a Universal Mobile Telecommunications System (UMTS, Universal Mobile Telecommunication System), which are not limited by the embodiments of the present invention. However, for ease of description, the embodiments of the present invention are described by using an LTE network as an example.

The embodiments of the present invention may be used in radio networks with different standards. A radio access network may include different network elements in different systems. For example, network elements of the radio access network in the LTE and LTE-A systems include an eNB (eNodeB, evolved NodeB), and network elements of the radio access network in the WCDMA (Wideband Code Division Multiple Access, Wideband Code Division Multiple Access) system include an RNC (Radio Network Controller, radio network controller) and a NodeB. Similarly, other radio networks such as the WiMAX (Worldwide Interoperability for Microwave Access, worldwide interoperability for microwave access) may also use solutions similar to those of the embodiments of the present invention, but related modules in a base station system may be different. No limitation is set by the embodiments of the present invention. However, for ease of description, the following embodiments are described by using an eNodeB as an example.

It should also be understood that, in the embodiments of the present invention, a user equipment (UE, User Equipment) may also be referred to as a terminal, a mobile station (MS, Mobile Station), a mobile terminal (Mobile Terminal), and the like. The user equipment may communicate with one or more core networks by using a radio access network (RAN, Radio Access Network), for example, the user equipment may be a mobile phone (or referred to as a "cellular" phone), or a computer having a communication function. For example, the user equipment may also be a portable, pocket-sized, handheld, computer built-in, or vehicle-mounted mobile apparatus.

In an LTE communications system, a base station can determine the number of PRBs available for each UE by comprehensively considering resources available for the LTE communications system, the number of UEs in the LTE communications system, and traffic to be transmitted by each UE. The number of PRBs is equivalent to "a first number of PRBs" in the following embodiments of the present invention. In addition, according to channel quality indicator (Channel Quality Indicator, CQI) information fed back by the UE, or in a self-determination manner, the base station can determine a modulation and coding scheme that is used in a process of transmission between the UE and the base station. When the base station needs to send data to the UE, the base station uses a control channel to notify the UE of the following: the modulation and coding scheme used by the base station to send the data to the UE, and the number of PRBs; and sends the data to the UE over a shared channel. In this way, the UE receives the modulation and coding scheme and the number of PRBs over the control channel, and receives the data according to the modulation and coding scheme and the number of PRBs, where the data is sent by the base station over the shared channel. When the UE sends data to the base station, the data may also be sent to the base station over the shared channel according to the modulation and coding scheme and the number of PRBs.

FIG. 1 is a flowchart of a data processing method according to an embodiment of the present invention. As shown in FIG. 1, the data processing method in this embodiment is executed by a base station. The data processing method in this embodiment may specifically include the following steps:

100. The base station obtains a second number of PRBs according to a first number of PRBs.

In this embodiment, the second number of PRBs is smaller than the first number of PRBs, and the first number of PRBs is exactly divisible by the second number of PRBs. The first PRB in this embodiment is the PRB in the prior art.

101. The base station sends indication information to a user equipment (User Equipment, UE), where the indication information is used to indicate the second number of PRBs or an encoded bit repetition multiple, and the encoded bit repetition multiple is equal to the first number of PRBs divided by the second number of PRBs.

For example, the indication information is available for the UE to obtain the encoded bit repetition multiple according to the indication information, and perform data transmission according to the encoded bit repetition multiple. For details, refer to description in the following embodiment on the UE side.

In this embodiment, the UE performs data transmission according to the encoded bit repetition multiple. Specifically, the UE may send or receive data according to the encoded bit repetition multiple. For example, the UE may duplicate the encoded bit for a number of times that is equal to the encoded bit repetition multiple and then perform sending; or when the UE learns that duplicates amounting to the known encoded bit repetition multiple exist in the received data, the UE combines repeated signals in soft bit information before decoding, for example, performs maximum-ratio combining or equal-gain combining, and then sends the combined soft bit information into a decoder for decoding, so as to implement data receiving.

According to the data transmission method in this embodiment, by using the foregoing technical solution, a base station obtains a second number of PRBs according to a first number of PRBs, and sends indication information that is used to indicate an encoded bit repetition multiple or the second number of PRBs, to a UE, where the encoded bit repetition multiple is equal to the first number of PRBs divided by the second number of PRBs; and the UE obtains the encoded bit repetition multiple according to the indication information, and performs data transmission according to the encoded bit repetition multiple. Compared with the prior art that can achieve a lowest code rate of 0.1, the technical solution in this embodiment implements data transmission according to the encoded bit repetition multiple, thereby further reducing the code rate, implementing data transmission at a code rate lower than 0.1, and further enhancing a maximum coverage capability of a radio communications system.

Optionally, after step 101 in the embodiment shown in FIG. 1, the following steps may be further included:

The base station receives data sent by the UE, where the data is transmitted by the UE according to the encoded bit repetition multiple.

Specifically, in step 101, after the base station sends the indication information to the UE, the UE may obtain the encoded bit repetition multiple according to the indication information, and perform data transmission according to the encoded bit repetition multiple. For example, the UE transmits data to the base station according to the encoded bit repetition multiple.

Optionally, step 100 "The base station obtains a second number of PRBs according to a first number of PRBs" in the embodiment shown in FIG. 1 may specifically include: obtaining, by the base station, the second number of PRBs from a preset table of mapping relationships between the first number of PRBs and at least one second number of PRBs, where the first number of PRBs is exactly divisible by each second number of PRBs among the at least one second number of PRBs.

Further, optionally, before the "obtaining, by the base station, the second number of PRBs from a preset table of mapping relationships between the first number of PRBs and at least one second number of PRBs", the method may further include:

establishing, by the base station, the table of mapping relationships between the first number of PRBs and the at least one second number of PRBs, where, in the table of mapping relationships, each first number of PRBs corresponds to at least one second number of PRBs.

To describe the mapping relationships between the second number of PRBs and the first number of PRBs more clearly, the following uses the first number of PRBs ranging from 1 to 110 in the prior art as an example, and analyzes, in detail, the corresponding at least one second number of PRBs by which the first number of PRBs is exactly divisible when the first number of PRBs is any one value of 1 to 110. For details, refer to Table 1 below. That is, each first number of PRBs and a corresponding at least one second number of PRBs in the following Table 1 may constitute a table of mapping relationships between the first number of PRBs and the corresponding at least one second number of PRBs. The following Table 1 may be considered as including tables of mapping relationships that exist when the first number of PRBs ranges from 1 to 110.

TABLE 1

| | First number of PRBs | | | | | | | | | |
|---|---|---|---|---|---|---|---|---|---|---|
| | 1 | 2 | 3 | 4 | 5 | 6 | 7 | 8 | 9 | 10 |
| Second number of PRBs | — | 1 | 1 | 1, 2 | 1 | 1, 2, 3 | 1 | 1, 2, 4 | 1, 3 | 1, 2, 5 |

| | First number of PRBs | | | | | | | | | |
|---|---|---|---|---|---|---|---|---|---|---|
| | 11 | 12 | 13 | 14 | 15 | 16 | 17 | 18 | 19 | 20 |
| Second number of PRBs | 1, | 1, 2, 3, 4, | 1 | 1, 2, 7 | 1, 3, 5 | 1, 2, 4, 8 | 1 | 1, 2, 3, 6, | 1 | 1, 2, 4, 5, |

TABLE 1-continued

|  |  | 6 |  |  |  |  | 9 | 10 |
| --- | --- | --- | --- | --- | --- | --- | --- | --- |
| First number of PRBs |||||||||
| 21 | 22 | 23 | 24 | 25 | 26 | 27 | 28 | 29 | 30 |

| | 21 | 22 | 23 | 24 | 25 | 26 | 27 | 28 | 29 | 30 |
| --- | --- | --- | --- | --- | --- | --- | --- | --- | --- | --- |
| Second number of PRBs | 1, 3, 7 | 1, 2, 11 | 1 | 1, 2, 3, 4, 6, 12 | 1, 5 | 1, 2, 13 | 1, 3, 9 | 1, 2, 4, 7, 14 | 1 | 1, 2, 3, 5, 6, 10, 15 |

| First number of PRBs |
| --- |
| 31 | 32 | 33 | 34 | 35 | 36 | 37 | 38 | 39 | 40 |

| | 31 | 32 | 33 | 34 | 35 | 36 | 37 | 38 | 39 | 40 |
| --- | --- | --- | --- | --- | --- | --- | --- | --- | --- | --- |
| Second number of PRBs | 1 | 1, 2, 4, 8, 16 | 1, 3, 11 | 1, 2, 17 | 1, 5, 7 | 1, 2, 3, 4, 6, 12, 18 | 1 | 1, 2, 19 | 1 | 1, 2, 4, 5, 8, 10, 20 |

| First number of PRBs |
| --- |
| 41 | 42 | 43 | 44 | 45 | 46 | 47 | 48 | 49 | 50 |

| | 41 | 42 | 43 | 44 | 45 | 46 | 47 | 48 | 49 | 50 |
| --- | --- | --- | --- | --- | --- | --- | --- | --- | --- | --- |
| Second number of PRBs | 1 | 1, 2, 3, 6, 7, 14, 21 | 1 | 1, 2, 4, 11, 22 | 1, 3, 5, 9, 15 | 1, 2, 23 | 1 | 1, 2, 3, 4, 6, 8, 12, 16, 24 | 1, 7 | 1, 2, 5, 10, 25 |

| First number of PRBs |
| --- |
| 51 | 52 | 53 | 54 | 55 | 56 | 57 | 58 | 59 | 60 |

| | 51 | 52 | 53 | 54 | 55 | 56 | 57 | 58 | 59 | 60 |
| --- | --- | --- | --- | --- | --- | --- | --- | --- | --- | --- |
| Second number of PRBs | 1, 3, 17 | 1, 2, 4, 13 | 1 | 1, 2, 3, 6, 9, 18, 27 | 1, 5, 11 | 1, 2, 4, 7, 8, 14, 28 | 1, 3, 19 | 1, 2, 29 | 1 | 1, 2, 3, 4, 5, 6, 10, 12, 15, 20, 30 |

| First number of PRBs |
| --- |
| 61 | 62 | 63 | 64 | 65 | 66 | 67 | 68 | 69 | 70 |

| | 61 | 62 | 63 | 64 | 65 | 66 | 67 | 68 | 69 | 70 |
| --- | --- | --- | --- | --- | --- | --- | --- | --- | --- | --- |
| Second number of PRBs | 1 | 1, 2, 31 | 1, 3, 7, 9, 21 | 1, 2, 4, 8, 16, 32 | 1, 5, 13 | 1, 2, 3, 11, 22, 33 | 1 | 1, 2, 4, 17, 34 | 1, 3, 23 | 1, 2, 5, 7, 10, 35 |

| First number of PRBs |
| --- |
| 71 | 72 | 73 | 74 | 75 | 76 | 77 | 78 | 79 | 80. |

| | 71 | 72 | 73 | 74 | 75 | 76 | 77 | 78 | 79 | 80 |
| --- | --- | --- | --- | --- | --- | --- | --- | --- | --- | --- |
| Second number of PRBs | 1 | 1, 2, 3, 4, 6, 8, 9, 18, 24, | 1, 7, 9 | 1, 2, 37 | 1, 3, 5, 15 | 1, 2, 4, 19 | 1, 7, 11 | 1, 2, 3, 13, 26, 39 | 1 | 1, 2, 4, 5, 8, 10, 16, 20, 40 |

TABLE 1-continued

36

| | First number of PRBs | | | | | | | | | |
|---|---|---|---|---|---|---|---|---|---|---|
| | 81 | 82 | 83 | 84 | 85 | 86 | 87 | 88 | 89 | 90 |
| Second number of PRBs | 1, 3, 9, 27 | 1, 2, 41 | 1 | 1, 2, 3, 4, 6, 7, 8, 12, 14, 18, 21, 28, 42 | 1, 5, 17 | 1, 2, 43 | 1, 3, 29 | 1, 2, 4, 11, 22, 44 | 1 | 1, 2, 3, 5, 6, 9, 10, 15, 18, 30, 45 |

| | First number of PRBs | | | | | | | | | |
|---|---|---|---|---|---|---|---|---|---|---|
| | 91 | 92 | 93 | 94 | 95 | 96 | 97 | 98 | 99 | 100 |
| Second number of PRBs | 1 | 1, 2, 4, 23, 46 | 1, 3, 31 | 1, 2, 47 | 1, 5, 19 | 1, 2, 3, 4, 6, 8, 12, 16, 24, 32, 48 | 1 | 1, 2, 7, 14, 49 | 1, 3, 11, 33 | 1, 2, 4, 5, 10, 20, 25, 50 |

| | First number of PRBs | | | | | | | | | |
|---|---|---|---|---|---|---|---|---|---|---|
| | 101 | 102 | 103 | 104 | 105 | 106 | 107 | 108 | 109 | 110 |
| Second number of PRBs | 1 | 1, 2, 3, 17, 51 | 1 | 1, 2, 4, 13, 26, 52 | 1, 3, 5, 7, 15, 21, 35 | 1, 2, 53 | 1 | 1, 2, 3, 6, 9, 18, 27, 36, 54 | 1 | 1, 2, 5, 10, 11, 22, 55 |

On the base station side, at least one second number of PRBs corresponding to each first number of PRBs can be obtained according to the foregoing table, where the at least one second number of PRBs constitutes a set of second numbers of PRBs. Any one second number of PRBs may be obtained from the set of second numbers of PRBs.

Further, optionally, in an actual application, the second number of PRBs may also be obtained according to an actual requirement. For example, the base station may obtain the encoded bit repetition multiple by comparing an expected code rate with a code rate accomplishable in the prior art (for example, the code rate obtained after a lowest-order modulation and coding scheme is selected is 0.1 in the prior art), that is, by dividing the existing code rate by the expected code rate (for example, when the multiple is not an integer, the multiple may be rounded up or down). For example, the existing lowest code rate divided by the expected code rate is a multiple 4. If the first number of PRBs in this case is 84, the second number of PRBs in this case needs to be 84/4=21.

It should be noted that if the repetition multiple actually required is 5 but a repetition multiples available is only 4 or 6, the following solutions are available: 1. selecting either repetition multiple 4 or 6; or, by adjusting the first number of PRBs, selecting a repetition multiple that meets requirements (for example, after the first number of PRBs is changed to 85, the repetition multiple 5 may be selected).

In the foregoing Table 1, when the second number of PRBs is at most the first number of PRBs being 84, the corresponding second number of PRBs in this case is 13. In addition, when the indication information in the foregoing embodiment is used to indicate the second number of PRBs, 4-bit indication information is required to indicate the second number of PRBs in this case. For example, Table 2 below describes the second number of PRBs and the corresponding indication information when the first number of PRBs is 84. The indication information in Table 2 is 4 bits. In an actual application, as shown in Table 1, when the second number of PRBs is smaller, indication information of smaller than 4 bits may also be used.

TABLE 2

| First number of PRBs | Indication information | Second number of PRBs |
|---|---|---|
| 84 | 0000 | 1 |
|    | 0001 | 2 |
|    | 0010 | 3 |
|    | 0011 | 4 |
|    | 0100 | 6 |
|    | 0101 | 7 |
|    | 0110 | 8 |
|    | 0111 | 12 |
|    | 1000 | 14 |
|    | 1001 | 18 |
|    | 1010 | 21 |
|    | 1011 | 28 |
|    | 1100 | 42 |

The mapping relationship between the indication information and the indicated corresponding second number of PRBs in the foregoing Table 2 (without being limited to the mapping relationship in the foregoing Table 2) may be predefined between the base station and the UE. In this way, when receiving the indication information from the base station, the UE can determine, according to the indication information, the second number of PRBs indicated by the indication information.

In step 101 in the embodiment shown in FIG. 1, when the indication information sent by the base station to the UE is used to indicate the second number of PRBs, the base station may also indicate the first number of PRBs to the UE in a relevant manner covered in the prior art. In this way, the base station can obtain the encoded bit repetition multiple (that is, a multiple obtained by dividing the first number of PRBs by the second number of PRBs) according to the first number of PRBs and the second number of PRBs, and then perform data transmission according to the encoded bit repetition multiple.

However, in view of great pressure brought by increased bits of the indication information on transmission of the indication information, the set of second numbers of PRBs corresponding to each first number of PRBs may be compressed. For example, the reserved second numbers of PRBs are determined for a given number of bits of the indication information. For example, if the indication information is 3 bits, it can be determined that the set of second numbers of PRBs includes n=8 choices at most. Still using 84 as an example of the first number of PRBs, when the number of bits of the indication information is 3, the corresponding second number of PRBs and the corresponding indication information are shown in Table 3. In an actual application, the indication information shown in Table 3 is used to indicate a specific second number of PRBs in the set of second numbers of PRBs, which may be set according to an actual requirement and is not limited herein.

TABLE 3

| First number of PRBs | Indication information | Second number of PRBs |
|---|---|---|
| 84 | 000 | 1 |
|    | 001 | 2 |
|    | 010 | 3 |
|    | 011 | 4 |
|    | 100 | 6 |
|    | 101 | 7 |
|    | 110 | 8 |
|    | 111 | 12 |

It should be noted that in the embodiment shown in FIG. 1, the indication information is further used to indicate the encoded bit repetition multiple. In this case, in the embodiment shown in FIG. 1, the step 101 "The base station obtains the indication information that is used to indicate the second number of PRBs or the encoded bit repetition multiple" specifically means that the base station obtains the indication information that is used to indicate the second number of PRBs, or the base station obtains the indication information that is used to indicate the encoded bit repetition multiple. When the base station obtains the indication information that is used to indicate the second number of PRBs, the indication information that is used to indicate the second number of PRBs may be obtained in the manner described in the foregoing Table 2 or Table 3.

When the base station obtains the indication information that is used to indicate the encoded bit repetition multiple, step 101 in the foregoing embodiment may specifically include the following steps:

(1) The base station obtains the encoded bit repetition multiple according to the first number of PRBs and the second number of PRBs.

(2) The base station obtains the indication information corresponding to the encoded bit repetition multiple.

Still using 84 as an example of the first number of PRBs, the following Table 4 describes the encoded bit repetition multiple and the corresponding indication information, which are calculated by using each corresponding second number of PRBs in Table 3.

TABLE 4

| First number of PRBs | Indication information | Encoded bit repetition multiple |
|---|---|---|
| 84 | 000 | 84 |
|    | 001 | 42 |
|    | 010 | 28 |
|    | 011 | 21 |
|    | 100 | 14 |
|    | 101 | 12 |
|    | 110 | 8 |
|    | 111 | 7 |

Likewise, the mapping relationship between the encoded bit repetition multiple and the indication information may be predefined between the UE and the base station. In this way, after receiving the indication information sent by the base station, the UE can determine the corresponding encoded bit repetition multiple according to the indication information.

Optionally, on the basis of the embodiment shown in FIG. 1, step 102 "The base station sends indication information to a UE" may specifically include the following steps:

(a) The base station adds a field to downlink control information (Downlink Control information, DCI), and uses the added field to carry the indication information.

(b) The base station sends the DCI that carries the indication information to the UE.

Further, optionally, a length of the indication information in the foregoing embodiment ranges from 0 to 4 bits.

According to the data transmission method in the foregoing embodiment, by using the foregoing technical solution, the UE can perform data transmission according to the encoded bit repetition multiple, thereby further reducing the code rate, implementing data transmission at a code rate lower than 0.1, and further enhancing a maximum coverage capability of a radio communications system.

Figure 2:
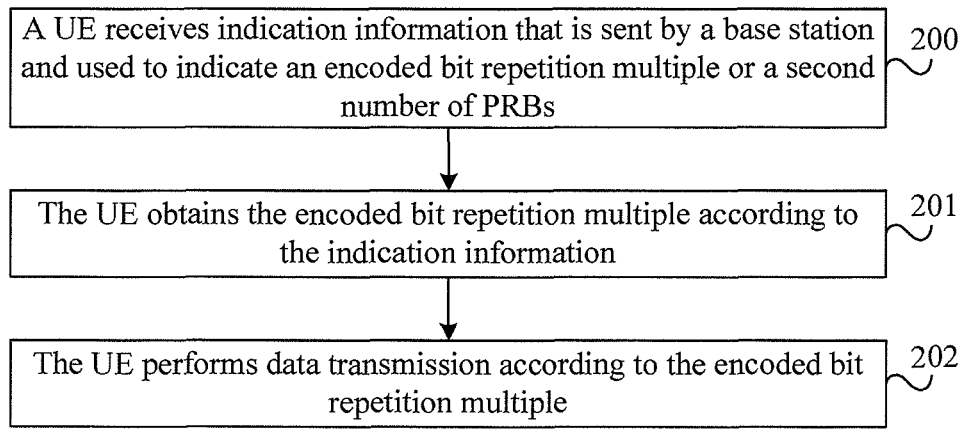
FIG. 2 is a flowchart of a data transmission method according to another embodiment of the present invention.

FIG. 2 is a flowchart of a data transmission method according to another embodiment of the present invention.

As shown in FIG. 2, an execution body of the data processing method in this embodiment is a UE. As shown in FIG. 2, the data processing method in this embodiment may specifically include the following steps:

200. The UE receives indication information that is sent by a base station and used to indicate an encoded bit repetition multiple or a second number of PRBs.

In this embodiment, the second number of PRBs is obtained by the base station according to a first number of PRBs, the second number of PRBs is smaller than the first number of PRBs, the first number of PRBs is exactly divisible by the second number of PRBs, and the encoded bit repetition multiple is equal to the first number of PRBs divided by the second number of PRBs.

201. The UE obtains the encoded bit repetition multiple according to the indication information.

202. The UE performs data transmission according to the encoded bit repetition multiple.

This embodiment differs from the embodiment shown in FIG. 1 only in that: The embodiment shown in FIG. 1 describes the technical solution of the present invention from a perspective of a base station side, but this embodiment describes the technical solution of the present invention from a perspective of a UE side. For details, refer to the description of the embodiment shown in FIG. 1, which is not described herein again.

According to the data transmission method in this embodiment, by using the foregoing technical solution, a UE receives indication information that is sent by a base station and used to indicate an encoded bit repetition multiple or a second number of PRBs, where the second number of PRBs is obtained by the base station according to a first number of PRBs, the second number of PRBs is smaller than the first number of PRBs, and the first number of PRBs is exactly divisible by the second number of PRBs; the encoded bit repetition multiple is equal to the first number of PRBs divided by the second number of PRBs; and the UE obtains the encoded bit repetition multiple according to the indication information, and performs data transmission according to the encoded bit repetition multiple. Compared with the prior art that can achieve a lowest code rate of 0.1, the technical solution in this embodiment implements data transmission according to the encoded bit repetition multiple, thereby further reducing the code rate, implementing data transmission at a code rate lower than 0.1, and further enhancing a maximum coverage capability of a radio communications system.

Optionally, on the basis of the embodiment shown in FIG. 2, step 200 "The UE receives indication information that is sent by a base station and used to indicate an encoded bit repetition multiple or a second number of PRBs" may specifically include: receiving, by the UE, DCI information sent by the base station, where a newly added field in the DCI information carries the indication information that is used to indicate the encoded bit repetition multiple or the second number of PRBs. For details, refer to the description of subsequent alternative embodiments shown in FIG. 1, which are not described herein again.

Optionally, on the basis of the embodiment shown in FIG. 2, when the indication information is used to indicate the second number of PRBs, step 201 "The UE obtains the encoded bit repetition multiple according to the indication information" in the foregoing embodiment may specifically include the following steps:

(1) The UE obtains the second number of PRBs according to the indication information.

(2) The UE obtains the encoded bit repetition multiple according to the first number of PRBs and the second number of PRBs.

Further, optionally, a length of the indication information in the foregoing embodiment ranges from 0 to 4 bits.

It should be noted that, in the foregoing embodiment on the UE side, for details about the mapping relationship between the indication information that is used to indicate the encoded bit repetition multiple and the corresponding encoded bit repetition multiple, and details about the mapping relationship between the indication information that is used to indicate the second number of PRBs and the corresponding second number of PRBs, refer to the description of extension embodiments subsequent to the embodiment shown in FIG. 1, which are not described herein again.

According to the data transmission method in the foregoing embodiment, by using the foregoing technical solution, the UE can perform data transmission according to the encoded bit repetition multiple, thereby further reducing the code rate, implementing data transmission at a code rate lower than 0.1, and further enhancing a maximum coverage capability of a radio communications system.

A person of ordinary skill in the art may understand that, all or a part of the steps for implementing the foregoing method embodiments may be implemented by a program instructing relevant hardware. The program may be stored in a computer readable storage medium. When the program is executed, the steps that include the foregoing method embodiments are performed. The foregoing storage medium includes various media that can store program code, such as a ROM, a RAM, a magnetic disk, or an optical disc.

Figure 3:
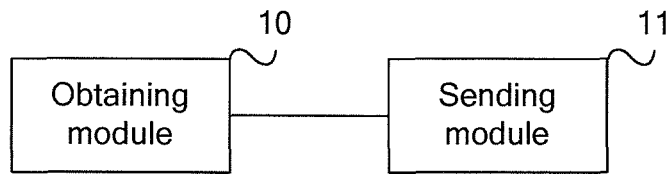
FIG. 3 is a schematic structural diagram of a base station according to an embodiment of the present invention.

FIG. 3 is a schematic structural diagram of a base station according to an embodiment of the present invention. As shown in FIG. 3, the base station in this embodiment may specifically include an obtaining module 10 and a sending module 11.

The obtaining module 10 is configured to obtain a second number of PRBs according to a first number of PRBs, where the second number of PRBs is smaller than the first number of PRBs, and the first number of PRBs is exactly divisible by the second number of PRBs. The sending module 11 may be connected to the obtaining module 10, and the sending module 11 is configured to send indication information to a UE, where the indication information is used to indicate the second number of PRBs that is obtained by the obtaining module 10, or indicate an encoded bit repetition multiple, where the repetition multiple is obtained according to the first number of PRBs and the second number of PRBs that is obtained by the obtaining module 10, and the encoded bit repetition multiple is equal to the first number of PRBs divided by the second number of PRBs.

The base station in this embodiment uses the foregoing modules to implement data transmission based on a same implementation mechanism as that of the relevant method embodiments described above. For details, refer to the description of the relevant method embodiments, which are not described herein again.

By using the foregoing modules, a base station in this embodiment obtains a second number of PRBs according to a first number of PRBs, and sends indication information that is used to indicate an encoded bit repetition multiple or the second number of PRBs, to a UE, where the encoded bit repetition multiple is equal to the first number of PRBs divided by the second number of PRBs; and the UE obtains the encoded bit repetition multiple according to the indication information, and performs data transmission according to the encoded bit repetition multiple. Compared with the prior art that can achieve a lowest code rate of 0.1, the technical solution in this embodiment implements data transmission according to the encoded bit repetition multiple, thereby further reducing the code rate, implementing data transmission at a code rate lower than 0.1, and further enhancing a maximum coverage capability of a radio communications system.

Figure 4:
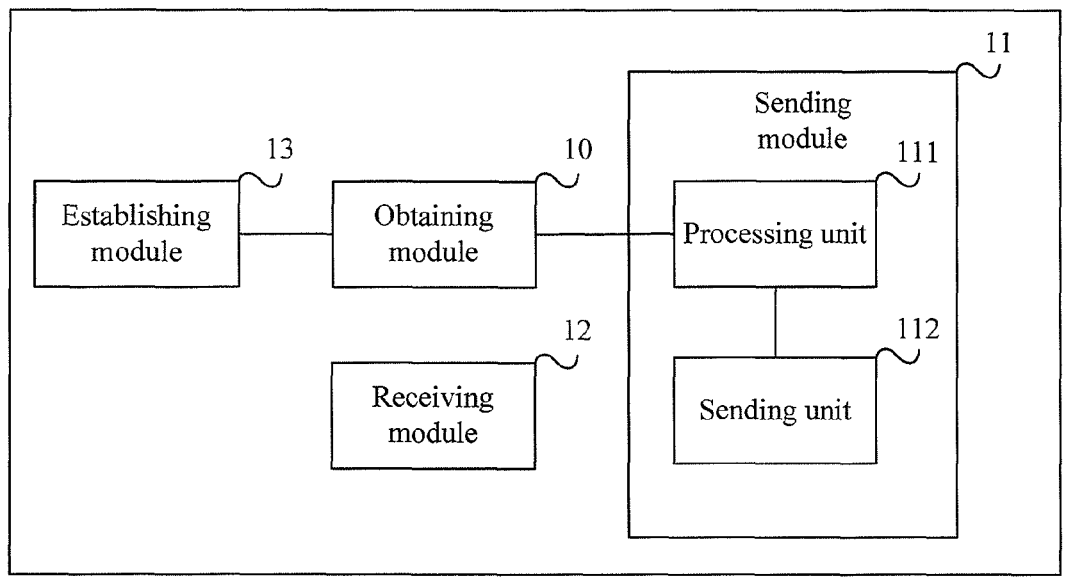
FIG. 4 is a schematic structural diagram of a base station according to another embodiment of the present invention.

FIG. 4 is a schematic structural diagram of a base station according to another embodiment of the present invention. As shown in FIG. 4, on the basis of the embodiment shown in FIG. 3, the base station in this embodiment may further include the following technical solution:

The base station in this embodiment further includes a receiving module 12. The receiving module 12 is configured to receive data sent by a UE, where the data is transmitted by the UE according to an encoded bit repetition multiple, which can reflect that indication information sent by the sending module 11 is available for the UE to obtain the encoded bit repetition multiple according to the indication information, and perform data transmission according to the encoded bit repetition multiple.

The obtaining module 10 in the base station in this embodiment is specifically configured to obtain the second number of PRBs from a preset table of mapping relationships between the first number of PRBs and at least one second number of PRBs, where the first number of PRBs is exactly divisible by each second number of PRBs among the at least one second number of PRBs.

Further, optionally, the base station in this embodiment may further include an establishing module 13. The establishing module 13 is configured to establish a table of mapping relationships between the first number of PRBs and the at least one second number of PRBs. The obtaining module 10 is connected to the establishing module 13, and the obtaining module 10 is configured to obtain the second number of PRBs from the table of mapping relationships between the number of first PRBs and the second number of PRBs, where the table is established by the establishing module 13.

Optionally, the obtaining module 10 in the base station in this embodiment is further configured to obtain the indication information that is used to indicate the second number of PRBs or the encoded bit repetition multiple.

Further, optionally, the obtaining module 10 in the base station in this embodiment is specifically configured to: when the indication information is used to indicate the encoded bit repetition multiple, obtain the encoded bit repetition multiple according to the first number of PRBs and the second number of PRBs; and then obtain the indication information corresponding to the encoded bit repetition multiple. However, when the indication information is used to indicate the second number of PRBs, the obtaining module 10 is configured to obtain the corresponding indication information according to the second number of PRBs.

Further, optionally, the sending module 11 in this embodiment includes a processing unit 111 and a sending unit 112. The processing unit 111 is connected to the obtaining module 10, and the processing unit 111 is configured to add a field to DCI, and use the added field to carry the indication information obtained by the obtaining module 10; alternatively, according to the second number of PRBs that is obtained by the obtaining module 10, the processing unit 111 determines the indication information that is used to indicate the second number of PRBs, and uses the added field to carry the obtained indication information; still alternatively, according to the first number of PRBs and the second number of PRBs that is obtained by the obtaining module 10, the processing unit 111 determines the indication information that is used to indicate the encoded bit repetition multiple, and uses the added field to carry the obtained indication information. Optionally, a length of the indication information ranges from 0 to 4 bits. The sending unit 112 is connected to the processing unit 111, and the sending unit 112 is configured to send the DCI to the UE, where the DCI carries the indication information and is obtained by the processing unit 111 by means of processing.

The base station in this embodiment uses the foregoing modules to implement data transmission based on a same implementation mechanism as that of the relevant method embodiments described above. For details, refer to the description of the relevant method embodiments, which are not described herein again.

By using the foregoing modules, a base station in this embodiment enables a UE to perform data transmission according to an encoded bit repetition multiple, thereby further reducing the code rate, implementing data transmission at a code rate lower than 0.1, and further enhancing a maximum coverage capability of a radio communications system.

Figure 5:
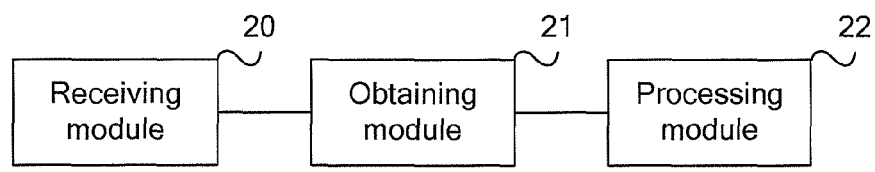
FIG. 5 is a schematic structural diagram of a UE according to an embodiment of the present invention.

FIG. 5 is a schematic structural diagram of a UE according to an embodiment of the present invention. As shown in FIG. 5, the UE in this embodiment may specifically include a receiving module 20, an obtaining module 21, and a processing module 22.

The receiving module 20 is configured to receive indication information that is sent by a base station and used to indicate an encoded bit repetition multiple or a second number of PRBs, where the second number of PRBs is obtained by the base station according to a first number of PRBs, the second number of PRBs is smaller than the first number of PRBs, the first number of PRBs is exactly divisible by the second number of PRBs, and the encoded bit repetition multiple is equal to the first number of PRBs divided by the second number of PRBs. The obtaining module 21 is connected to the receiving module 20, and the obtaining module 21 is configured to obtain the encoded bit repetition multiple according to the indication information received by the receiving module 20. The processing module 22 is connected to the obtaining module 21, and the processing module 22 is configured to perform data transmission according to the encoded bit repetition multiple, where the encoded bit repetition multiple is obtained by the obtaining module 21.

The UE in this embodiment uses the foregoing modules to implement data transmission based on a same implementation mechanism as that of the relevant method embodiments described above. For details, refer to the description of the relevant method embodiments, which are not described herein again.

By using the foregoing modules, an UE in this embodiment receives indication information that is sent by a base station and used to indicate an encoded bit repetition multiple or a second number of PRBs, where the second number of PRBs is obtained by the base station according to a first number of PRBs, the second number of PRBs is smaller than the first number of PRBs, and the first number of PRBs is exactly divisible by the second number of PRBs; the encoded bit repetition multiple is equal to the first number of PRBs divided by the second number of PRBs; and the UE obtains the encoded bit repetition multiple according to the indication information, and performs data transmission according to the encoded bit repetition multiple. Compared with the prior art that can achieve a lowest code rate of 0.1, the technical solution in this embodiment implements data transmission according to the encoded bit repetition multiple, thereby further reducing the code rate, implementing data transmission at a code rate lower than 0.1, and further enhancing a maximum coverage capability of a radio communications system.

Optionally, on the basis of the embodiment shown in FIG. 5, the receiving module 20 is specifically configured to receive DCI sent by the base station, where a newly added field in the DCI carries the indication information that is used to indicate the encoded bit repetition multiple or the second number of PRBs, and optionally, a length of the indication information ranges from 0 to 4 bits.

Optionally, on the basis of the embodiment shown in FIG. 5, the obtaining module 21 is specifically configured to: when the indication information received by the receiving module 20 is used to indicate the second number of PRBs, obtain the second number of PRBs according to the indication information received by the receiving module 20; and then obtain the encoded bit repetition multiple according to the first number of PRBs and the second number of PRBs.

Figure 6:
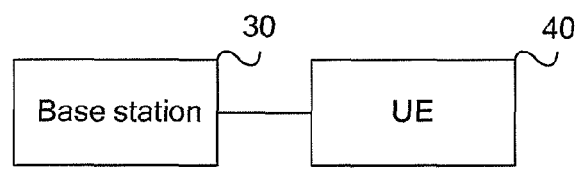
FIG. 6 is a schematic structural diagram of a data transmission system according to an embodiment of the present invention.

FIG. 6 is a schematic structural diagram of a data transmission system according to an embodiment of the present invention. As shown in FIG. 6, the data processing system in this embodiment includes a base station 30 and a UE 40.

The base station 30 in this embodiment may specifically be a base station described in the embodiment shown in FIG. 3 or FIG. 4. The UE 40 in this embodiment may specifically be a UE described in the embodiment shown in FIG. 5. Specifically, data transmission between the base station and the UE in this embodiment may be based on a technical solution in the embodiment shown in FIG. 1 or FIG. 2 and corresponding subsequent alternative embodiments. For details, refer to the description of the relevant embodiments, which are not described herein again.

The data processing system in this embodiment uses the foregoing base station and UE. The base station obtains a second number of PRBs according to a first number of PRBs, and sends indication information that is used to indicate an encoded bit repetition multiple or the second number of PRBs, to a UE, where the encoded bit repetition multiple is equal to the first number of PRBs divided by the second number of PRBs; and the UE obtains the encoded bit repetition multiple according to the indication information, and performs data transmission according to the encoded bit repetition multiple. Compared with the prior art that can achieve a lowest code rate of 0.1, the technical solution in this embodiment implements data transmission according to the encoded bit repetition multiple, thereby further reducing the code rate, implementing data transmission at a code rate lower than 0.1, and further enhancing a maximum coverage capability of a radio communications system.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for ease and brevity of description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention, other than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, without departing from the spirit and scope of the technical solutions of the embodiments of the present invention.

What is claimed is:
1. A method, comprising:
  obtaining a second number of physical resource blocks according to a first number of physical resource blocks, wherein the second number of physical resource blocks is smaller than the first number of physical resource blocks, and the first number of physical resource blocks is exactly divisible by the second number of physical resource blocks; and sending indication information to a user equipment, wherein the indication information is used to indicate the second number of physical resource blocks or an encoded bit repetition multiple, and the encoded bit repetition multiple is equal to the first number of physical resource blocks divided by the second number of physical resource blocks.

2. The method according to claim 1, further comprising:
receiving data sent by the user equipment, wherein the data is transmitted by the user equipment according to the encoded bit repetition multiple.

3. The method according to claim 1, wherein obtaining a second number of physical resource blocks according to a first number of physical resource blocks comprises:
obtaining the second number of physical resource blocks from a preset table of mapping relationships between the first number of physical resource blocks and at least one second number of physical resource blocks, wherein the first number of physical resource blocks is exactly divisible by each second number of physical resource blocks among the at least one second number of physical resource blocks.

4. The method according to claim 3, wherein, before obtaining the second number of physical resource blocks from a preset table of mapping relationships between the first number of physical resource blocks and the second number of physical resource blocks, the method further comprises:
establishing the table of mapping relationships between the first number of physical resource blocks and the at least one second number of physical resource blocks.

5. The method according to claim 1, wherein, after obtaining a second number of physical resource blocks according to a first number of physical resource blocks and before sending the indication information to a user equipment, the method further comprises:
obtaining the indication information that is used to indicate the second number of physical resource blocks or the encoded bit repetition multiple.

6. The method according to claim 5, wherein, when the indication information is used to indicate the encoded bit repetition multiple, obtaining the indication information that is used to indicate the second number of physical resource blocks or the encoded bit repetition multiple comprises:
obtaining the encoded bit repetition multiple according to the first number of physical resource blocks and the second number of physical resource blocks; and
obtaining the indication information corresponding to the encoded bit repetition multiple.

7. The method according to claim 1, wherein sending indication information to a user equipment comprises:
adding a field to downlink control information, and using the added field to carry the indication information; and
sending the downlink control information that carries the indication information to the user equipment.

8. A method, comprising:
receiving indication information sent by a base station and used to indicate an encoded bit repetition multiple or a second number of physical resource blocks, wherein the second number of physical resource blocks is obtained by the base station according to a first number of physical resource blocks, the second number of physical resource blocks is smaller than the first number of physical resource blocks, the first number of physical resource blocks is exactly divisible by the second number of physical resource blocks, and the encoded bit repetition multiple is equal to the first number of physical resource blocks divided by the second number of physical resource blocks;
obtaining the encoded bit repetition multiple according to the indication information; and
performing data transmission according to the encoded bit repetition multiple.

9. The method according to claim 8, wherein receiving indication information sent by a base station and used to indicate an encoded bit repetition multiple or a second number of physical resource blocks comprises:
receiving downlink control information sent by the base station, wherein a newly added field in the downlink control information carries the indication information that is used to indicate the encoded bit repetition multiple or the second number of physical resource blocks.

10. The method according to claim 8, wherein, when the indication information is used to indicate the second number of physical resource blocks, obtaining the encoded bit repetition multiple according to the indication information comprises:
obtaining the second number of physical resource blocks according to the indication information; and
obtaining the encoded bit repetition multiple according to the first number of physical resource blocks and the second number of physical resource blocks.

11. A base station, comprising:
at least one processor configured to obtain a second number of physical resource blocks according to a first number of physical resource blocks, wherein the second number of physical resource blocks is smaller than the first number of physical resource blocks, and the first number of physical resource blocks is exactly divisible by the second number of physical resource blocks; and
a transceiver configured to send indication information to a user equipment, wherein the indication information is used to indicate the second number of physical resource blocks or an encoded bit repetition multiple, and the encoded bit repetition multiple is equal to the first number of physical resource blocks divided by the second number of physical resource blocks.

12. The base station according to claim 11, wherein the transceiver is further configured to receive data sent by the user equipment, wherein the data is transmitted by the user equipment according to the encoded bit repetition multiple.

13. The base station according to claim 11, wherein the at least one processor is configured to obtain the second number of physical resource blocks from a preset table of mapping relationships between the first number of physical resource blocks and at least one second number of physical resource blocks, wherein the first number of physical resource blocks is exactly divisible by each second number of physical resource blocks among the at least one second number of physical resource blocks.

14. The base station according to claim 13, wherein the at least one processor is further configured to establish the table of mapping relationships between the first number of physical resource blocks and the at least one second number of physical resource blocks before the second number of physical resource blocks is obtained from the preset table of mapping relationships between the first number of physical resource blocks and the second number of physical resource blocks.

15. The base station according to claim 11, wherein the at least one processor is further configured to: after the second number of physical resource blocks is obtained according to the first number of physical resource blocks and before the indication information is sent to a user equipment, obtain the indication information that is used to indicate the second number of physical resource blocks or the encoded bit repetition multiple.

16. The base station according to claim 15, wherein the at least one processor is further configured to: when the indication information is used to indicate the encoded bit repetition multiple, obtain the encoded bit repetition multiple according to the first number of physical resource blocks and the second number of physical resource blocks; and then obtain the indication information corresponding to the encoded bit repetition multiple.

17. The base station according to claim 11, wherein:

the at least one processor is further configured to add a field to downlink control information, and use the added field to carry the indication information, wherein a length of the indication information is between 1 and 4 bits inclusive; and the transceiver is further configured to send the downlink control information that carries the indication information to the user equipment.

18. A user equipment, comprising:

transceiver configured to receive indication information that is sent by a base station and used to indicate an encoded bit repetition multiple or a second number of physical resource blocks, wherein the second number of physical resource blocks is obtained by the base station according to a first number of physical resource blocks, the second number of physical resource blocks is smaller than the first number of physical resource blocks, the first number of physical resource blocks is exactly divisible by the second number of physical resource blocks, and the encoded bit repetition multiple is equal to the first number of physical resource blocks divided by the second number of physical resource blocks; and at least one processor configured to obtain the encoded bit repetition multiple according to the indication information;

wherein the transceiver is further configured to perform data transmission according to the encoded bit repetition multiple.

19. The user equipment according to claim 18, wherein the transceiver is further configured to receive downlink control information sent by the base station, wherein a newly added field in the downlink control information carries the indication information that is used to indicate the encoded bit repetition multiple or the second number of physical resource blocks, and a length of the indication information is between 1 and 4 bits inclusive.

20. The user equipment according to claim 18, wherein the at least one processor is further configured to: when the indication information is used to indicate the second number of physical resource blocks, obtain the second number of physical resource blocks according to the indication information, and then obtain the encoded bit repetition multiple according to the first number of physical resource blocks and the second number of physical resource blocks.

\* \* \* \* \*